US012200430B2

(12) United States Patent
Zhang et al.

(10) Patent No.: US 12,200,430 B2
(45) Date of Patent: Jan. 14, 2025

(54) ACOUSTIC DEVICE

(71) Applicant: SHENZHEN SHOKZ CO., LTD., Guangdong (CN)

(72) Inventors: Lei Zhang, Shenzhen (CN); Xin Qi, Shenzhen (CN); Junjiang Fu, Shenzhen (CN); Zhen Wang, Shenzhen (CN); Liwei Wang, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 174 days.

(21) Appl. No.: 17/806,277

(22) Filed: Jun. 10, 2022

(65) Prior Publication Data

US 2022/0386011 A1 Dec. 1, 2022

Related U.S. Application Data

(63) Continuation of application No. PCT/CN2020/128525, filed on Nov. 13, 2020.

(30) Foreign Application Priority Data

Mar. 31, 2020 (CN) ........................ 202010247338.2

(51) Int. Cl.
*H04R 1/28* (2006.01)
*H04R 1/10* (2006.01)
(Continued)

(52) U.S. Cl.
CPC ......... *H04R 1/2803* (2013.01); *H04R 1/1016* (2013.01); *H04R 1/105* (2013.01);
(Continued)

(58) Field of Classification Search
CPC ... H04R 1/1016; H04R 1/105; H04R 2640/13
See application file for complete search history.

(56) References Cited

U.S. PATENT DOCUMENTS

2008/0101643 A1* 5/2008 Shyu ........................ H04M 1/05 381/74
2009/0245556 A1* 10/2009 Parker .................. H04R 25/606 381/326
(Continued)

FOREIGN PATENT DOCUMENTS

CN 102014328 A 4/2011
CN 202721792 U 2/2013
(Continued)

OTHER PUBLICATIONS

The Extended European Search Report in European Application No. 20929142.6 mailed on Jan. 18, 2023, 12 pages.
(Continued)

*Primary Examiner* — Suhan Ni
(74) *Attorney, Agent, or Firm* — METIS IP LLC

(57) ABSTRACT

The present disclosure relates to acoustic devices. The acoustic device may include a vibration speaker, a delivery mechanism mechanically connected to the vibration speaker, and a support component mechanically connected to the vibration speaker via the delivery mechanism. The vibration speaker may be configured to produce a vibration signal representing a sound according to an electrical signal. The delivery mechanism may be configured to contact a user via a contact portion on the delivery mechanism, and deliver the vibration signal to the user via the contact portion. The contact portion on the delivery mechanism may be at a distance from the vibration speaker and have a less vibration intensity than that of the vibration speaker. The support component may be configured to support the delivery mechanism.

20 Claims, 3 Drawing Sheets

(51) Int. Cl.

| | |
|---|---|
| ***H04R 1/34*** | (2006.01) |
| ***H04R 7/16*** | (2006.01) |
| ***H04R 9/02*** | (2006.01) |
| ***H04R 9/06*** | (2006.01) |

(52) U.S. Cl.

CPC ............... *H04R 1/345* (2013.01); *H04R 7/16* (2013.01); *H04R 9/025* (2013.01); *H04R 9/06* (2013.01); *H04R 2460/13* (2013.01)

(56) References Cited

U.S. PATENT DOCUMENTS

| | | | | |
|---|---|---|---|---|
| 2009/0290730 | A1 | 11/2009 | Fukuda et al. | |
| 2010/0217102 | A1* | 8/2010 | LeBoeuf .............. | A61B 5/7282 600/310 |
| 2013/0343562 | A1* | 12/2013 | Amsalem ............... | H04R 1/105 381/74 |
| 2014/0270293 | A1* | 9/2014 | Ruppersberg ........ | H04R 25/606 381/326 |
| 2014/0355777 | A1 | 12/2014 | Nabata et al. | |
| 2017/0180892 | A1 | 6/2017 | Hillbratt et al. | |
| 2017/0188126 | A1 | 6/2017 | Hirano | |
| 2018/0160209 | A1 | 6/2018 | Ogata et al. | |
| 2018/0288539 | A1 | 10/2018 | Bervoets | |
| 2020/0037080 | A1 | 1/2020 | Biggs | |
| 2020/0092633 | A1 | 3/2020 | Zhang et al. | |
| 2021/0092525 | A1 | 3/2021 | Zheng et al. | |

FOREIGN PATENT DOCUMENTS

| | | | |
|---|---|---|---|
| CN | 105007551 | A | 10/2015 |
| CN | 105007551 | B | 4/2017 |
| CN | 206674151 | U | 11/2017 |
| CN | 208798151 | U | 4/2019 |
| KR | 100937159 | B1 | 1/2010 |

OTHER PUBLICATIONS

Office Action in Russian Application No. 2022116652 mailed on Feb. 3, 2023, 12 pages.

International Search Report in PCT/CN2020/128525 mailed on Feb. 18, 2021, 5 pages.

Written Opinion in PCT/CN2020/128525 mailed on Feb. 18, 2021, 4 pages.

First Examination Report in Indian Application No. 202217035576 mailed on Nov. 15, 2022, 5 pages.

Notice of Preliminary Rejection in Korean Application No. 10-2022-7029798 mailed on Sep. 19, 2023, 10 pages.

* cited by examiner

ACOUSTIC DEVICE

CROSS-REFERENCE TO RELATED APPLICATION

This application is a continuation of International Application No. PCT/CN2020/128525, filed on Nov. 13, 2020, which claims priority of Chinese Patent Application No. 202010247338.2, filed on Mar. 31, 2020, the contents of each of which are hereby incorporated by reference.

TECHNICAL FIELD

The present disclosure generally relates to an acoustic device, and particularly, to an acoustic device with a delivery mechanism.

BACKGROUND

Vibration speakers can convert electrical signals into mechanical vibration signals, and transmit the mechanical vibration signals to a user through human tissues and/or bones so that the user can hear sounds. Generally, when a vibration speaker outputs low-frequency vibration signals to the user via a direct contact with the user, the user may feel a strong sense of vibration, which may cause an uncomfortable experience to the user. It is desirable to provide vibration speakers that have abundant low-frequency signals and can also improve user experience.

SUMMARY

According to an aspect of the present disclosure, an acoustic device is provided. The acoustic device may include a vibration speaker configured to produce a vibration signal representing a sound according to an electrical signal. The acoustic device may further include a delivery mechanism mechanically connected to the vibration speaker. The delivery mechanism may be configured to contact a user via a contact portion on the delivery mechanism and deliver the vibration signal to the user via the contact portion. The contact portion on the delivery mechanism may be at a distance from the vibration speaker and have a less vibration intensity than that of the vibration speaker. The acoustic device may further include a support component mechanically connected to the vibration speaker via the delivery mechanism. The support component may be configured to support the delivery mechanism.

In some embodiments, the delivery mechanism may include an elastic element. The elastic element may include at least one arc portion.

In some embodiments, a first end of the at least one arc portion may be mechanically connected to the support component and a second end of the at least one arc portion may be mechanically connected to the vibration speaker directly or via a connection portion. The contact portion of the delivery mechanism may be on the at least one arc portion, and the vibration speaker may vibrate around the contact portion in response to the vibration signal.

In some embodiments, a contact area between the delivery mechanism and the user may change in response to the vibration signal.

In some embodiments, the delivery mechanism may include a connection unit, a vibration plate, and an elastic element. The vibration speaker may be mechanically connected to a first end of the connection unit. The vibration plate may be mechanically connected to a second end of the connection unit. The support component may be connected to the connection unit via the elastic element. The vibration speaker may vibrate around a connection point between the support component and the elastic element in response to the vibration signal.

In some embodiments, a surface of the vibration speaker may face an ear canal of the user when the user wears the acoustic device.

In some embodiments, the vibration speaker may include one or more openings configured to transmit air conduction waves generated inside a housing of the vibration speaker to the user. The one or more openings may be arranged toward an ear canal of the user when the user wears the acoustic device.

In some embodiments, the acoustic device may further include an auxiliary support component directly connected to the vibration speaker. The auxiliary support component may be configured to support the vibration speaker.

In some embodiments, an angle between the delivery mechanism and a plane where the user's skin is located may be in an angle range from 0° to 90°, or from 0° to 70°, or from 5° to 50°, or from 10° to 50°, or from 10° to 30°.

In some embodiments, a lowest resonance peak of the vibration speaker is less than 90 Hz.

In some embodiments, the vibration speaker may include a magnetic circuit component, a vibration component, and a housing. The lowest resonance peak of the vibration speaker may be related to an elastic moduli of the vibration component of the vibration speaker.

In some embodiments, the support component may include a fixing portion, the fixing portion may have a U-shape or a C-shape.

In some embodiments, the support component may include a shell structure with a hollow interior, the hollow interior may accommodate at least one of a battery, a Bluetooth device, or a circuit board.

According to another aspect of the present disclosure, an electronic device is provided. The electronic device may comprise an acoustic device. The acoustic device may include a vibration speaker configured to produce a vibration signal representing a sound according to an electrical signal. The acoustic device may further include a delivery mechanism mechanically connected to the vibration speaker. The delivery mechanism may be configured to contact a user via a contact portion on the delivery mechanism and deliver the vibration signal to the user via the contact portion. The contact portion on the delivery mechanism may be at a distance from the vibration speaker and have a less vibration intensity than that of the vibration speaker. The acoustic device may further include a support component mechanically connected to the vibration speaker via the delivery mechanism. The support component may be configured to support the delivery mechanism.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
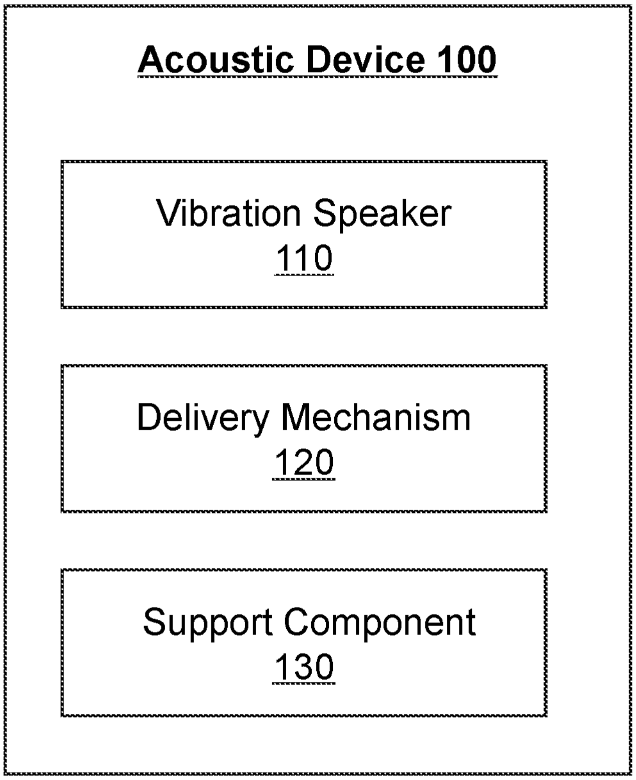
FIG. 1 is a block diagram illustrating an exemplary acoustic device according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms “a,” “an,” and “the” may be intended to include the plural forms as well, unless the context clearly indicates otherwise. It will be further understood that the terms “comprises,” “comprising,” “includes,” and/or “including” when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawing(s), all of which form part of this specification. It is to be expressly understood, however, that the drawing(s) is for the purpose of illustration and description only and are not intended to limit the scope of the present disclosure. It is understood that the drawings are not to scale.

It will be understood that, although the terms “first,” “second,” “third,” etc., may be used herein to describe various elements, these elements should not be limited by these terms. These terms are only used to distinguish one element from another. For example, a first element could be termed a second element, and, similarly, a second element could be termed a first element, without departing from the scope of exemplary embodiments of the present disclosure.

Spatial and functional relationships between elements are described using various terms, including “connected,” “attached,” and “mounted.” Unless explicitly described as being “direct,” when a relationship between first and second elements is described in the present disclosure, that relationship includes a direct relationship where no other intervening elements are present between the first and second elements, and also an indirect relationship where one or more intervening elements are present (either spatially or functionally) between the first and second elements. In contrast, when an element is referred to as being “directly” connected, attached, or positioned to another element, there are no intervening elements present. Other words used to describe the relationship between elements should be interpreted in a like fashion (e.g., “between,” versus “directly between,” “adjacent,” versus “directly adjacent”).

It should also be understood that terms such as “top,” “bottom,” “upper,” “lower,” “vertical,” “lateral,” “above,” “below,” “upward(s),” “downward(s),” “left-hand side,” “right-hand side,” “left,” “right,” “horizontal,” and other such spatial reference terms are used in a relative sense to describe the positions or orientations of certain surfaces/parts/components of the acoustic device with respect to other such features of the acoustic device when the acoustic device is in a normal operating position and may change if the position or orientation of the acoustic device changes.

An aspect of the present disclosure relates to an acoustic device. The acoustic device may include a vibration speaker, a delivery mechanism, and a support component. The vibration speaker may be configured to produce a vibration signal representing a sound according to an electrical signal. The delivery mechanism may be mechanically connected to the vibration speaker. The delivery mechanism may be configured to contact a user via a contact portion on the delivery mechanism and deliver the vibration signal to the user via the contact portion. The contact portion on the delivery mechanism may be at a distance from the vibration speaker and have a less vibration intensity than that of the vibration speaker. The support component may be mechanically connected to the vibration speaker via the delivery mechanism. The support component may be configured to support the delivery mechanism.

In some embodiments, a contact area between the contact portion of the delivery mechanism and the user may change in response to the vibration signal. During a vibration signal delivering process, when the vibration speaker vibrates toward the user, the contact area between the contact portion of the delivery mechanism and the user (or user’s skin) can be decreased gradually, which is smaller than a contact area when the vibration speaker directly contacts the user normally, thereby further reducing the vibration sensation of the user. In addition, since the contact portion of the delivery mechanism has a less vibration intensity than that of the vibration speaker, the vibration intensity of the vibration signal delivered to the user by the delivery mechanism may be reduced, thereby further reducing the vibration sensation of the user.

In some alternative embodiments, the delivery mechanism may be an elastic element with an arc portion, thus the contact area between the contact portion of the delivery mechanism and the user may not change (or substantially not change) in response to the vibration signal. During a vibration signal delivering process, when the vibration speaker vibrates toward the user, part of the vibration signal generated by the vibration speaker can be converted into elastic deformation of the elastic element. Thus, the vibration sensation of the user may be smaller than a vibration sensation of the user in which the vibration speaker directly contacts the user.

Moreover, the vibration speaker may be arranged such that a surface of the vibration speaker faces an ear canal of the user. In this way, when the vibration speaker vibrates toward the user, the vibration speaker can drive the air around the vibration speaker to vibrate and transmit sound signal(s) to the user through the air, thereby enhancing sound intensity delivered to the user. As a result, the vibration speaker can be designed to provide deeper low-frequency signals such that the sound energy at the low-frequency range gets more abundant, thereby strengthening the feeling of users for sound (e.g., music) in low-frequency signals and allowing the users to feel more low-frequency effects.

FIG. 1 is a block diagram illustrating an exemplary acoustic device according to some embodiments of the present disclosure. For example, the acoustic device 100 may be an acoustic device of an electronic device, such as an earphone, a headphone, a virtual reality glasses, an augmented reality glasses, etc. As illustrated in FIG. 1, the acoustic device 100 may include a vibration speaker 110, a delivery mechanism 120, and a support component 130. The vibration speaker 110 may be connected to the support component 130 via the delivery mechanism 120.

The vibration speaker 110 may be configured to produce vibration signal(s) representing a sound according to electrical signal(s). The electrical signal(s) may contain sound information. The sound information may refer to a video file or an audio file with a specific data format, and may also refer to general data or a file which may be converted to sound through specific approaches eventually. The electrical signal(s) may be received from a signal source such as a microphone, a computer, a mobile phone, an MP3 player, etc. For example, a microphone may receive sound signal(s) from a sound source. Then the microphone may convert the received sound signal(s) into the electrical signal(s) and transmit the electrical signal(s) to the vibration speaker 110. As another example, the vibration speaker 110 may be connected to or communicated with an MP3 player, the MP3 player may directly transmit the electrical signal(s) to the vibration speaker 110. In some embodiments, the vibration speaker 110 may be connected to and/or communicated with the signal source via a wired connection, a wireless connection, or a combination thereof. The wired connection may include, for example, an electrical cable, an optical cable, a telephone wire, or the like, or any combination thereof. The wireless connection may include a Bluetooth™ network, a local area network (LAN), a wide area network (WAN)), a near field communication (NFC) network, a ZigBee™ network, or the like, or any combination thereof.

In some embodiments, the vibration speaker 110 may be a bone conduction speaker. In some embodiments, the vibration speaker 110 may be a composite speaker. In such cases, the vibration speaker 110 may produce bone conduction waves and air conduction waves that can both be perceived by the user wearing it. It should be noted that the vibration speaker 110 may be of various types, such as an electromagnetic type (e.g., a moving-coil type, a moving-iron type, etc.), a piezoelectric type, an inversed piezoelectric type, an electrostatic type, etc., which is not limited in the present disclosure.

The delivery mechanism 120 may be mechanically connected to the vibration speaker 110. Thus, the delivery mechanism 120 may receive the vibration signal(s) from the vibration speaker 110. When the acoustic device 100 is worn on a user, an angle between the delivery mechanism 120 and the user may be formed. As used herein, the angle between the delivery mechanism 120 and the user refers to an angle between the long axis of the delivery mechanism 120 and a plane where the user's skin is located. In some embodiments, the angle may be in an angle range from 0 to 90°, or from 0° to 70°, or from 5° to 50°, or from 10° to 50°, or from 10° to 30°, etc.

The delivery mechanism 120 may be configured to contact a user via a contact portion on the delivery mechanism 120 and deliver the received vibration signal(s) to the user via the contact portion. In some embodiments, a contact area between the delivery mechanism 120 and the user (e.g., user's skin) may change in response to the vibration signal(s). In some embodiments, a region of the user's body that the contact portion on the delivery mechanism 120 is positioned at and/or contacted with may include the forehead, the neck (e.g., the throat), the face (e.g., an area around the mouth, the chin), the top of the head, a mastoid, an area around an ear, a temple, or the like, or any combination thereof.

The contact portion on the delivery mechanism 120 may be at a distance from the vibration speaker 110. The vibration speaker 110 may vibrate around a rotation axis near the contact portion of the delivery mechanism 120. In such cases, the contact portion on the delivery mechanism 120 may be closer to the rotation axis than that of the vibration speaker 110. Thus, the contact portion on the delivery mechanism 120 may have a less vibration intensity than that of the vibration speaker 110, thereby reducing the vibration transmitted to the user. For example, the delivery mechanism 120 may include an elastic element having at least one arc portion. The contact portion of the delivery mechanism 120 may be on the convex part of the at least one arc portion. The vibration speaker 110 may vibrate around the contact portion in response to the vibration signal(s). More descriptions about the arc portion may be found elsewhere in the present disclosure (e.g., FIG. 3A and the descriptions thereof). As another example, the delivery mechanism 120 may include a connection unit, a vibration plate, and an elastic element. The vibration speaker 110 may be disposed on an upper surface of the connection unit and the vibration plate may be connected to one end of the connection unit. The contact portion of the delivery mechanism 120 may be on the vibration plate The support component 130 may be connected to the connection unit or the vibration plate via the elastic element. The vibration speaker 110 may vibrate around a connection point between the support component 130 and the elastic element in response to the vibration signal(s). More descriptions about the delivery mechanism with a connection unit, a vibration plate, and an elastic element may be found elsewhere in the present disclosure (e.g., FIG. 2A and the descriptions thereof).

In some embodiments, the contact portion of the delivery mechanism 120 may be positioned at a region around the ear, in which the vibration speaker 110 can be arranged such that a surface of the vibration speaker 110 faces an ear canal of the user. In this way, when the vibration speaker vibrates, the vibration speaker 110 may drive the air around the vibration speaker to vibrate and produce air conduction waves. The air conduction waves may be transmitted to the ear through air, thereby enhancing sound intensity delivered to the user. Accordingly, the user may not only hear the bone conduction waves generated by the vibration of the contact portion of the delivery mechanism 120, but also hear the air conduction waves generated by the vibration speaker 110 driving the surrounding air.

In some alternative embodiments, the housing of the vibration speaker 110 may include one or more openings at, e.g., the sidewall of the housing, or the side facing the ear canal of the user. In this way, when the vibration speaker 110 vibrates, air conduction waves generated inside the housing of the vibration speaker 110 (e.g., by the vibration of a vibration component inside the housing) may be transmitted outside the housing through the one or more openings and further transmitted to the user's ear. In some embodiments, the one or more openings of the vibration speaker 110 can be arranged toward the ear canal of the user when the user wears the acoustic device 100. Accordingly, the user may further hear the air conduction waves transmitted by the one or more openings of the vibration speaker 110, thereby enhancing the sound intensity heard by the user.

The support component 130 may be mechanically connected to the vibration speaker 110 via the delivery mechanism 120. The support component 130 may be configured to support the delivery mechanism 120 and/or the vibration speaker 110 so that the delivery mechanism 120 can contact the user's skin.

In some embodiments, the support component 130 may include a fixing portion which allows the acoustic device 100 to be better fixed on the user, and prevent falling off during use by the user. In some embodiments, the fixing portion may have any shape suitable for a part (e.g., the ear, the head, the neck) of human body, for example, a U-shape, a C-shape, a circular ring shape, an ellipse shape, a semi-circular shape, etc., so that the acoustic device 100 may be independently worn on the user's body. For example, the shape of the fixing portion of the support component 130 may match the shape of the human auricle, so that the acoustic device 100 can be independently worn on the user's ear. As another example, the shape of the fixing portion of the support component 130 may match the shape of the human head, so that the support component 130 can be hung on the user's head, which prevents the acoustic device 100 from falling off easily.

In some embodiments, the support component 130 may be a shell structure with a hollow interior. The hollow interior may hold a battery, a circuit board, a Bluetooth device, or the like, or any combination thereof. In some embodiments, the support component 130 may be made of various materials such as metal materials (e.g., aluminum, gold, copper, etc.), alloy materials (e.g., aluminum alloys, titanium alloys, etc.), plastic materials (e.g., polyethylene, polypropylene, epoxy resin, nylon, etc.), fiber materials (e.g., acetate fiber, propionic acid fiber, carbon fiber, etc.), etc. In some embodiments, the support component 130 may be provided with a sheath. The sheath may be made of soft materials with certain elasticity, such as soft silica gel, rubber, etc. which can provide better touch for users.

It should be noted that the above descriptions of the acoustic device 100 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the connection between any two components (e.g., the vibration speaker 110, the delivery mechanism 120, and the support component 130) of the acoustic device 100 may include bonding, riveting, thread connection, integral forming, suction connection, or the like, or any combination thereof.

In some embodiments, the acoustic device 100 may further include an auxiliary support component configured to assist the support component 130 to support the vibration speaker 110 by contacting the user. The auxiliary support component may have a rod-like structure and an end of the auxiliary support component may be directly connected to the vibration speaker 110. Accordingly, when the user wears the acoustic device 100, the auxiliary support component may be in contact with the user and the vibration speaker 110 such that the vibration speaker 110 can transmit a portion of the vibration signal(s) to the user through the auxiliary support component, thereby further enhancing the sound intensity heard by the user.

Figure 2A:
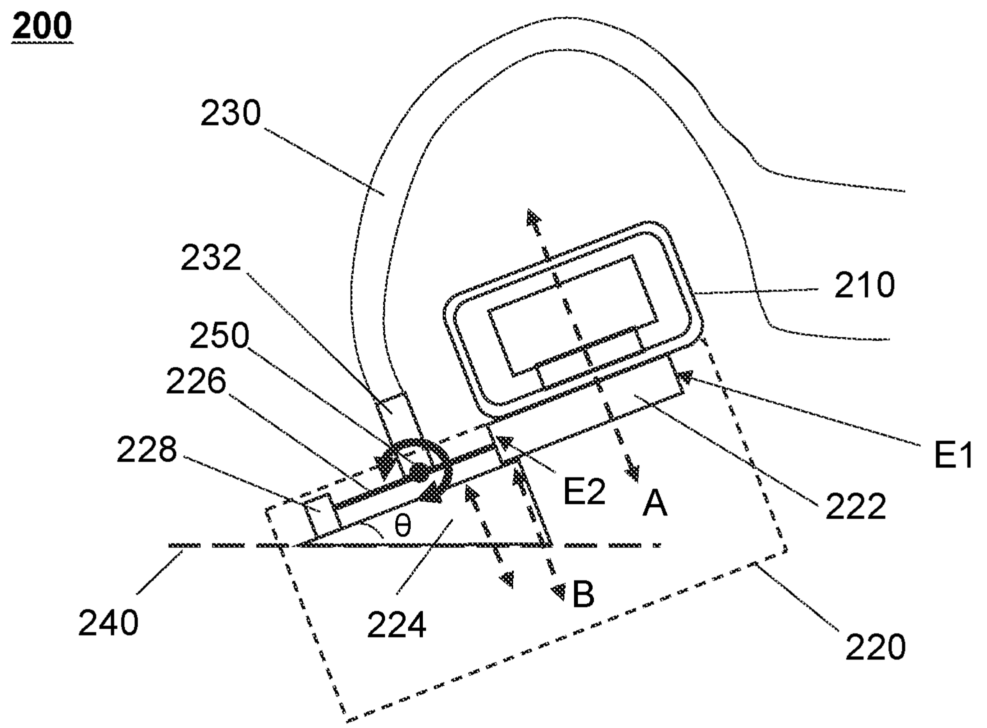
FIGS. 2A and 2B illustrate an initial state and an intermediate state of an exemplary acoustic device during a vibration signal delivering process according to some embodiments of the present disclosure.
Figure 2B:
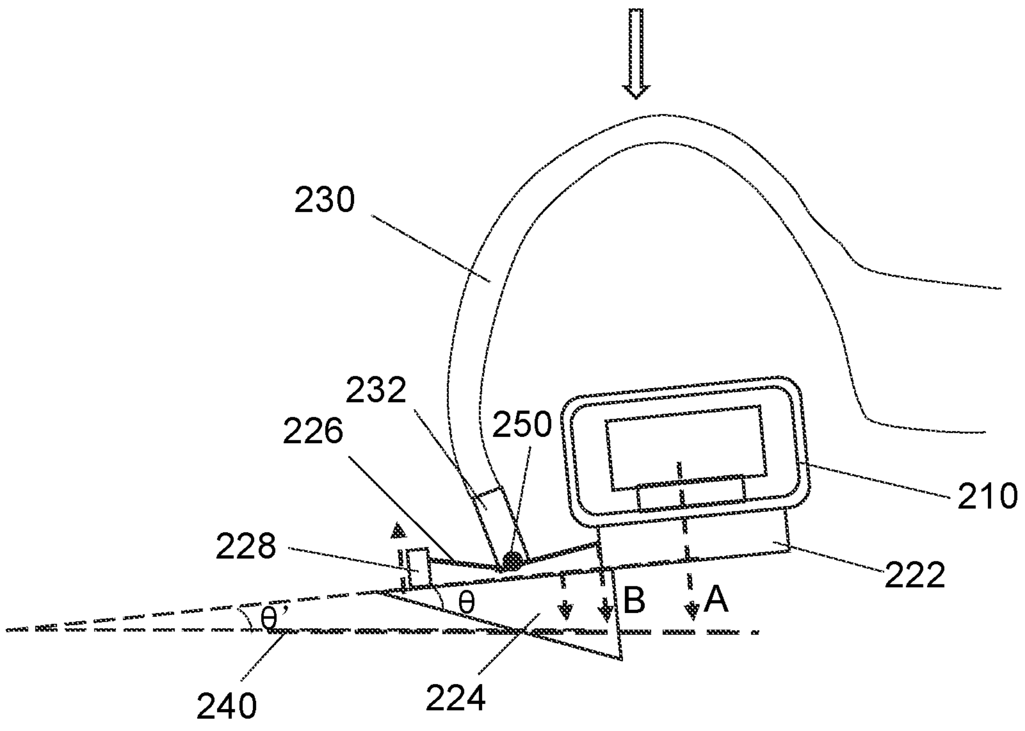

FIGS. 2A and 2B illustrate an initial state and an intermediate state of an exemplary acoustic device during a vibration signal delivering process according to some embodiments of the present disclosure. As shown in FIG. 2A, an acoustic device 200 may include a vibration speaker 210, a delivery mechanism 220 (components in dotted frame 220), and a support component 230.

The vibration speaker 210 may be connected to the support component 230 via the delivery mechanism 220. The vibration speaker 210 may generate vibration signal(s) representing a sound according to electrical signal(s). Merely by way of example, the vibration speaker 210 may include a magnetic circuit component, a vibration component, and a housing. The magnetic circuit component may be configured to provide a magnetic field. The vibration component may convert an electrical signal inputted into the vibration component to a mechanical vibration signal in the magnetic field. The housing may include a panel facing a human body side and a back opposite to the panel. The housing may accommodate the vibration component. In some embodiments, the vibration component may cause the panel and the back to vibrate. The vibration speaker 210 may provide various resonance peaks. In some embodiments, the vibration speaker 210 may provide one or more low-frequency resonance peaks in the frequency range of less than 500 Hz, or in the frequency range of less than 800 Hz, or in the frequency range of less than 1000 Hz. The low-frequency resonance peak(s) may be related to the elastic moduli of the vibration component. The less the elastic moduli of the vibration component, the lower the low-frequency resonance peak of the vibration speaker 210 may be.

The delivery mechanism 220 may deliver the vibration signal(s) to a user (e.g., the user's cochlea) by contacting the user. In some embodiments, the delivery mechanism 220 may include a connection unit 222, a vibration plate 224, and an elastic element 226. A contact portion on the delivery mechanism 220 that contacts the user may be on the vibration plate 224.

In some embodiments, the connection unit 222 may be a structure having two ends (e.g., a first end E1 and a second end E2). For example, the connection unit 222 may be a rod-like structure, a sheet-like structure, etc., having two ends. The vibration speaker 210 may be connected to the vibration plate 224 via the connection unit 222. For example, a sidewall (e.g., the lower sidewall) of the vibration speaker 210 may be connected to a side wall (e.g., the upper sidewall) of the connection unit 222. Optionally, the vibration speaker 210 may be disposed on the upper side or connected to the first end E1 of the connection unit 222. For example, when the connection unit 222 is a rectangular rod, the vibration speaker 210 may be disposed on the upper sidewall of the connection unit 222 as illustrated in FIG. 2A. For brevity, the upper side of the connection unit 222 refers to the side of the connection unit 222 that faces away from the user's skin, and the lower side of the connection unit 222 refers to the side of the connection unit 222 that faces towards the user's skin. Similarly, the upper side of the vibration speaker 210 refers to the side of the vibration speaker 210 that faces away from the user's skin, and the lower side of the vibration speaker 210 refers to the side of the vibration speaker 210 that faces towards the user's skin. In some embodiments, when the connection unit 222 is a rod structure, a cross-section of the rod may be of any other shape, such as a rectangle, a triangle, a circle, an ellipse, a regular hexagon, an irregular shape, etc. In some embodiments, when the connection unit 222 is a sheet, the shape of the sheet may include a rectangle, an ellipse, an irregular shape, etc.

The vibration plate 224 may be connected to the lower side of the connection unit 222 at the second end E2. The vibration plate 224, as well as the contact portion on the delivery mechanism 220, may be at a distance from the vibration speaker 210. The vibration plate 224 may be configured to contact the user (as illustrated in FIG. 2A, the dotted line 240 may be roughly regarded as the skin of the user) to deliver the vibration signal(s) to the user. In some embodiments, the vibration plate 224 may be a block such as a wedge-shaped block, which may allow or cause the vibration speaker 210 to be suspended above the skin of the user, thus forming an angle (e.g., 8 in FIG. 2A) between the upper surface or lower surface of the connection unit 222 and the surface of the user's skin. In some embodiments, the angle between the upper surface or lower surface of the connection unit 222 and the surface of the user's skin may be in a range from 0 to 90°, or from 0° to 70°, or from 5° to 50°, or from 10° to 50°, or from 10° to 30°, etc. In some embodiments, the angle between the upper surface or lower surface of the connection unit 222 and the surface of the user's skin may also be referred to as an angle between the delivery mechanism 220 and the user's skin 240 (or a plane where the user's skin is located).

The elastic element 226 and the vibration plate 224 may be located on the same end of the connection unit 222, i.e., the elastic element 226 may also be connected to the second end E2 of the connection unit 222. An upper surface of the vibration plate 224 may be provided with a convex structure 228 (as illustrated in FIG. 2A). Two ends of the elastic element 226 may be respectively connected to the convex structure 228 and the second end E2 of the connection unit 222. In some embodiments, the elastic element 226 may be a sheet-like structure or a rod-like structure with a certain elasticity.

A first end of the support component 230 may be connected with the elastic element 226 at any point (e.g., a center point) of the elastic element 226. In some embodiments, the first end of the support component 230 may be connected to the elastic element 226 directly or via a connection element 232. For example, the first end of the support component 230 may be connected to the center of the elastic element 226 directly or via the connection element 232. When the acoustic device 200 is fixedly worn on the user, the support component 230 may be regarded as to be stationary with respect to the user, and in such cases, the vibration speaker 210 may drive the connection unit 222 and the vibration plate 224 to rotate around a specific connection point 250 (e.g., the center point of the elastic element 226) between the support component 230 and the elastic element 226 in response to the vibration signal(s).

According to FIGS. 2A and 2B, FIG. 2A represents an initial state of the acoustic device 200 during a vibration signal delivering process, and FIG. 2B represents an intermediate state of the acoustic device 200 during the vibration signal delivering process. Arrow A denotes a vibration direction of the vibration speaker 210 and the length of the arrow A denotes the vibration intensity.

When the acoustic device 200 is in the initial state (FIG. 2A), the angle between the delivery mechanism 220 and the user's skin 240 has a value equal to 0, and at this time, a contact area between the vibration plate 224 and the user's skin 240 is the largest in the vibration signal delivering process. When the acoustic device 200 is in the intermediate state (FIG. 2B), an angle between the delivery mechanism 220 and the user's skin 240 may be smaller than the angle between the delivery mechanism 220 and the user's skin 240 in the initial state of the acoustic device 200. Accordingly, a contact area between the delivery mechanism 220 and the user's skin 240 may change in response to the vibration signal(s). For example, during a process that the vibration speaker 210 vibrates around the specific connection point 250 towards the user's skin 240, the angle between the delivery mechanism 220 and the user's skin 240 may decrease gradually (i.e., θ'<θ in FIG. 2B). In such cases, a contact area between the vibration plate 224 and the user's skin 240 in the intermediate state of the acoustic device 200 may be less than a contact area between the vibration plate 224 and the user's skin 240 in the initial state of the acoustic device 200. As a result, during the process that the vibration speaker 210 delivering vibration signal(s) to the user, the vibration sensation of the user may be reduced.

Moreover, since the vibration plate 224 is at a distance from the vibration speaker 210, and a distance from the vibration plate 224 to the specific connection point 250 is smaller than a distance from the vibration speaker 210 to the specific connection point 250, during the vibration signal delivering process, the vibration plate 224 may have a less vibration intensity than that of the vibration speaker 210, thereby further reducing the vibration sensation of the user. Merely by way of example, arrow B denotes the vibration of a point on the contact portion and the length of the arrow B denotes the vibration intensity of the point. Since the perpendicular distance from the specific connection point 250 to arrow B is less than the perpendicular distance from the specific connection point 250 to arrow A, the vibration intensity of arrow A (i.e., the length of arrow A) may be greater than the vibration intensity of arrow B (i.e., the length of arrow B).

Accordingly, by using the delivery mechanism 220, the vibration originating from the vibration speaker 210 may be reduced, protecting the user from uncomfortable vibration sensation in a low-frequency range. On this basis, the frequency response of the vibration speaker 210 can be more flexibly designed to adapt to different needs. For example, the lowest resonance peak of the vibration speaker 210 may be moved to a lower frequency range to provide more abundant low-frequency signals to the user. As described above, the lowest resonance peak of the vibration speaker 210 may be adjusted by changing the elastic moduli of the vibration component of the vibration speaker 210. In some embodiments, the elastic moduli of the vibration component of the vibration speaker 210 may be designed such that the lowest resonance peak of the vibration speaker 210 may be less than 2500 Hz, or less than 2000 Hz, or less than 1500 Hz, or less than 1200 Hz, or less than 1000 Hz, or less than 800 Hz, or less than 500 Hz, or less than 300 Hz, or less than 200 Hz, or less than 100 Hz, or less than 90 Hz, or less than 50 Hz.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the vibration speaker 210 may be connected to the vibration plate 224 directly, i.e., the connection unit 222 may be omitted. In such cases, the elastic element 226 may be directly connected to the vibration speaker 210. As another example, the acoustic device 200 may further include one or more additional components, such as an auxiliary support component (not shown). As still an example, the contact portion of the delivery mechanism 220 may be positioned at a region around the ear, in which the vibration speaker 210 can be arranged such that a surface of the vibration speaker 210 can face an ear canal of the user to better transmit air conduction waves to the ear. In some embodiments, the connection between any two components (e.g., the vibration speaker 210, the connection unit 222, the vibration plate 224, the support component 230, etc.) of the acoustic device 200 may include bonding, riveting, thread connection, integral forming, suction connection, or the like, or any combination thereof.

Figure 3A:
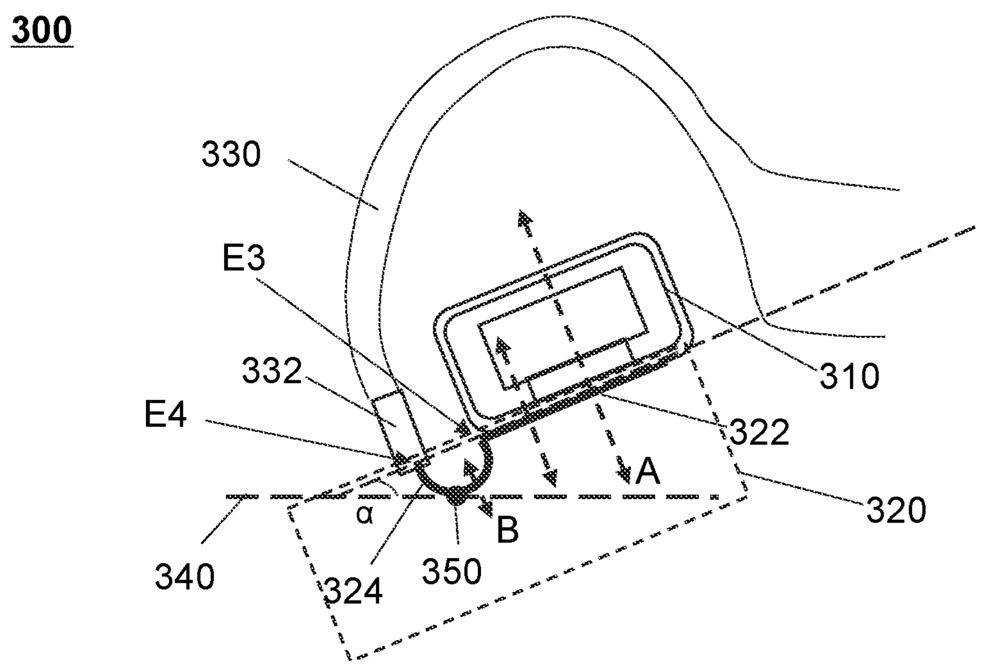
FIGS. 3A and 3B illustrate an initial state and an intermediate state of an exemplary acoustic device during a vibration signal delivering process according to some embodiments of the present disclosure.
Figure 3B:
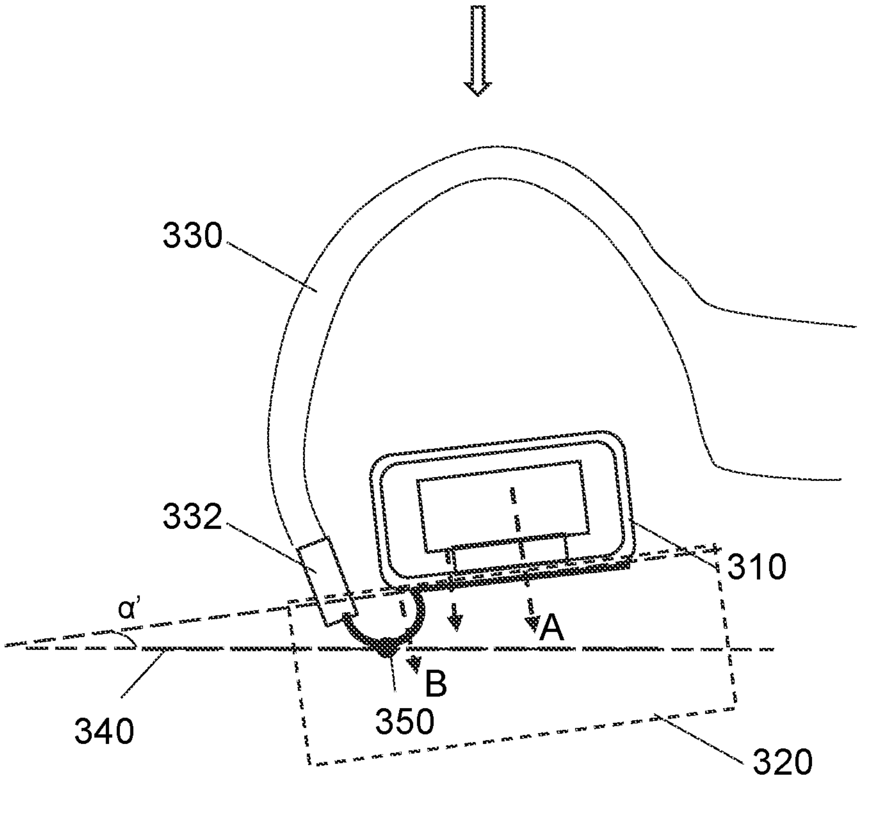

FIGS. 3A and 3B illustrate an initial state and an intermediate state of an exemplary acoustic device during a vibration signal delivering process according to some embodiments of the present disclosure. As illustrated in FIG. 3A, an acoustic device 300 may be similar to the acoustic device 200 illustrated in FIG. 2A. The acoustic device 300 may include a vibration speaker 310, a delivery mechanism 320, and a support component 330.

The vibration speaker 310 may be connected to the support component 330 via the delivery mechanism 320. The vibration speaker 310 may generate vibration signal(s) representing a sound according to electrical signal(s). The vibration speaker 310 may be similar to or same as the vibration speaker 210 illustrated in FIG. 2A.

The delivery mechanism 320 may include an elastic element. The elastic element may include a connection portion 322 and an arc portion 324, wherein a first end of the connection portion 322 is connected to a first end E3 of the arc portion 324. In some embodiments, the elastic element (e.g., the connection portion 322 and/or the arc portion 324) may be made of various elastic materials such as metal materials (e.g., aluminum, gold, copper, etc.), alloy materials (e.g., aluminum alloys, titanium alloys, etc.), plastic materials (e.g., polyethylene, polypropylene, epoxy resin, nylon, etc.), fiber materials (e.g., acetate fiber, propionic acid fiber, carbon fiber, etc.), etc.

The vibration speaker 310 may be mechanically connected to the connection portion 322. For example, when the connection portion 322 is a sheet-like structure, the vibration speaker 310 may be disposed on an upper surface of the connection portion 322. As another example, when the connection portion 322 is a rod-like structure, the vibration speaker 310 may be disposed on an upper surface of the connection portion 322, or a sidewall of the vibration speaker 310 may be connected to a second end of the connection portion 322.

The convex part of the arc portion 324 may be configured to contact with the user's skin 340, thus the vibration speaker 310 can deliver the vibration signal(s) to the user through the delivery mechanism 320. In such cases, a contact area between the arc portion 324 and the user's skin 340 may be smaller than that of the contact portion of the delivery mechanism 220 illustrated in FIG. 2A. The contact area between the delivery mechanism 320 and the user's skin 340 may be almost unchanged in response to the vibration signal(s). The vibration speaker 310 may be suspended on the skin of the user and an angle (e.g., a in FIG. 3A) between the connection portion 322 and the surface of the user's skin 340 may be formed. In some embodiments, the angle between the connection portion 322 and the surface of the user's skin 340 may be in a range from 0 to 90°, or from 0° to 70°, or from 5° to 50°, or from 10° to 50°, or from 10° to 30°, etc. In some embodiments, the angle between the connection portion 322 and the surface of the user's skin 340 may also be referred to as an angle between the delivery mechanism 320 and the user's skin 340 (or a plane where the user's skin is located).

In some embodiments, the convex part of the arc portion 324 that contacts with the user's skin 340 may also be referred to as a contact portion 350 of the delivery mechanism 320. The contact portion 350 on the delivery mechanism 320 may be at a distance from the vibration speaker 310. A second end E4 of the arc portion 324 may be connected with one end of the support component 330. When the acoustic device 300 is fixedly worn on the user, the support component 330 may be regarded as to be stationary with respect to the user, and in such cases, the vibration speaker 310 may drive the delivery mechanism 320 (i.e., the elastic element connection portion 322 and the arc portion 324) to vibrate or rotate around the contact portion 350 in response to the vibration signal(s). In some embodiments, the second end E4 of the arc portion 324 may be connected to the support component 330 via a connection element 332.

According to FIGS. 3A and 3B, FIG. 3A represents an initial state of the acoustic device 300 during a vibration signal delivering process, and FIG. 3B represents an intermediate state of the acoustic device 300 during the vibration signal delivering process. Arrow B denotes a vibration direction of the vibration speaker 310 and the length of the arrow B denotes the vibration intensity.

During the vibration signal delivering process, since a contact area between the arc portion 324 and the user's skin 340 is very small, and the vibration signal(s) generated by the vibration speaker 310 is partially converted into the elastic deformation of the delivery mechanism 320 (e.g., the connection portion 322 and/or the arc portion 324), the vibration sensation of the user may be reduced compared to the vibration sensation of the user when the vibration speaker 310 directly contacts the user's skin 340.

Moreover, since the contact portion 350 is at a distance from the vibration speaker 310, during the vibration signal delivering process, the contact portion 350 may have a less vibration intensity than that of the vibration speaker 310, thereby further reducing the vibration sensation of the user. Merely by way of example, arrow B denotes the vibration of a point near the contact portion 350 and the length of the arrow B denotes the vibration intensity of the point. Since the perpendicular distance from the contact portion 350 to arrow B is less than the perpendicular distance from the contact portion 350 to arrow A, the vibration intensity of arrow A (i.e., the length of arrow A) may be greater than the vibration intensity of arrow B (i.e., the length of arrow B).

Accordingly, by using the delivery mechanism 320, the vibration originating from the vibration speaker 310 may be reduced, protecting the user from uncomfortable vibration sensation in a low-frequency range. On this basis, the frequency response of the vibration speaker 310 can be more flexibly designed to adapt to different needs. For example, the lowest resonance peak of the vibration speaker 310 may be moved to a lower frequency range to provide more abundant low-frequency signals to the user. As described above, the lowest resonance peak of the vibration speaker 310 may be adjusted by changing the elastic moduli of a vibration component of the vibration speaker 310. In some embodiments, the elastic moduli of the vibration component of the vibration speaker 310 may be designed such that the lowest resonance peak of the vibration speaker 310 may be less than 2500 Hz, or less than 2000 Hz, or less than 1500 Hz, or less than 1200 Hz, or less than 1000 Hz, or less than 800 Hz, or less than 500 Hz, or less than 300 Hz, or less than 200 Hz, or less than 100 Hz, or less than 90 Hz, or less than 50 Hz.

Merely for illustration purposes, only one elastic element is described in the acoustic device 300. However, it should be noted that the acoustic device 300 in the present disclosure may also include multiple elastic elements, and thus the vibration signal(s) may also be jointly delivered by the multiple elastic elements. In some embodiments, the elastic element 320 may include multiple arc portions and thus the vibration signal(s) may also be jointly delivered by the multiple arc portions. For example, the multiple arc portions may be arranged side by side.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the arc portion 324 may be connected to the vibration speaker 310 directly, i.e., the connection portion 322 may be omitted. As another example, the acoustic device 300 may further include one or more additional components, such as an auxiliary support component (not shown). As still another example, the contact portion 350 of the delivery mechanism 320 may be positioned at a region around the ear, in which the vibration speaker 310 can be arranged such that a surface of the vibration speaker 310 can face an ear canal of the user to better transmit air conduction waves to the ear. In some embodiments, the connection between any two components (e.g., the vibration speaker 310, the arc portion 324, the connection portion 322, the support component 330, etc.) of the acoustic device 300 may include bonding, riveting, thread connection, integral forming, suction connection, or the like, or any combination thereof.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. An acoustic device, comprising:
- a vibration speaker configured to produce a vibration signal representing a sound according to an electrical signal;
- a delivery mechanism mechanically connected to the vibration speaker, the delivery mechanism being configured to contact a user via a contact portion on the delivery mechanism, and deliver the vibration signal to the user via the contact portion, the contact portion on the delivery mechanism being at a distance from the vibration speaker and having a less vibration intensity than that of the vibration speaker, wherein the delivery mechanism includes an elastic element, and the elastic element includes at least one arc portion; and
- a support component mechanically connected to the vibration speaker via the delivery mechanism, the support component being configured to support the delivery mechanism.

2. The acoustic device of claim 1, wherein a first end of the at least one arc portion is mechanically connected to the support component and a second end of the at least one arc portion is mechanically connected to the vibration speaker directly or via a connection portion, wherein
- the contact portion of the delivery mechanism is on the at least one arc portion, and the vibration speaker vibrates around the contact portion in response to the vibration signal.

3. The acoustic device of claim 1, wherein a contact area between the delivery mechanism and the user changes in response to the vibration signal.

4. The acoustic device of claim 1, wherein a surface of the vibration speaker faces an ear canal of the user when the user wears the acoustic device.

5. The acoustic device of claim 1, wherein the vibration speaker includes one or more openings configured to transmit air conduction waves generated inside a housing of the vibration speaker to the user, and the one or more openings are arranged toward an ear canal of the user when the user wears the acoustic device.

6. The acoustic device of claim 1, further comprising:
- an auxiliary support component directly connected to the vibration speaker, configured to support the vibration speaker.

7. The acoustic device of claim 1, wherein an angle between the delivery mechanism and a plane where the user's skin is located is in an angle range from 0° to 90°, or from 0° to 70°, or from 5° to 50°, or from 10° to 50°, or from 10° to 30°.

8. The acoustic device of claim 1, wherein a lowest resonance peak of the vibration speaker is less than 90 Hz.

9. The acoustic device of claim 8, wherein the vibration speaker includes a magnetic circuit component, a vibration component, and a housing, and the lowest resonance peak of the vibration speaker is related to an elastic moduli of the vibration component of the vibration speaker.

10. The acoustic device of claim 1, wherein the support component includes a fixing portion, the fixing portion has a U-shape or a C-shape.

11. The acoustic device of claim 10, wherein the support component includes a shell structure with a hollow interior, the hollow interior accommodates at least one of a battery, a Bluetooth device, or a circuit board.

12. An electronic device comprising an acoustic device, wherein the acoustic device includes:
- a vibration speaker configured to produce a vibration signal representing a sound according to an electrical signal;
- a delivery mechanism mechanically connected to the vibration speaker, the delivery mechanism being configured to contact a user via a contact portion on the delivery mechanism, and deliver the vibration signal to the user via the contact portion, the contact portion on the delivery mechanism being at a distance from the vibration speaker and having a less vibration intensity than that of the vibration speaker; and
- a support component mechanically connected to the vibration speaker via the delivery mechanism, the support component being configured to support the delivery mechanism, wherein the delivery mechanism includes:

a connection unit, wherein the vibration speaker is mechanically connected to a first end of the connection unit;

a vibration plate mechanically connected to a second end of the connection unit; and an elastic element, wherein the support component is connected to the connection unit via the elastic element, the vibration speaker vibrates around a connection point between the support component and the elastic element in response to the vibration signal.

13. The electronic device of claim 12, wherein a first end of the at least one arc portion is mechanically connected to the support component and a second end of the at least one arc portion is mechanically connected to the vibration speaker, wherein the contact portion of the delivery mechanism is on the at least one arc portion, and the vibration speaker vibrates around the contact portion in response to the vibration signal.

14. The electronic device of claim 12, wherein a contact area between the delivery mechanism and the user changes in response to the vibration signal.

15. The electronic device of claim 12, wherein a lowest resonance peak of the vibration speaker is less than 90 Hz.

16. The electronic device of claim 12, wherein the vibration speaker includes a magnetic circuit component, a vibration component, and a housing, and the lowest resonance peak of the vibration speaker is related to an elastic moduli of the vibration component of the vibration speaker.

17. The electronic device of claim 12, wherein a surface of the vibration speaker faces an ear canal of the user when the user wears the acoustic device.

18. The electronic device of claim 12, wherein the vibration speaker includes one or more openings configured to transmit air conduction waves generated inside a housing of the vibration speaker to the user, and the one or more openings are arranged toward an ear canal of the user when the user wears the acoustic device.

19. The electronic device of claim 12, wherein the acoustic device further comprises:

an auxiliary support component directly connected to the vibration speaker, configured to support the vibration speaker.

20. The electronic device of claim 12, wherein an angle between the delivery mechanism and a plane where the user's skin is located is in an angle range from 0° to 90°, or from 0° to 70°, or from 5° to 50°, or from 10° to 50°, or from 10° to 30°.

* * * * *